United States Patent [19]

Hanulik

[11] Patent Number: 5,045,160

[45] Date of Patent: Sep. 3, 1991

[54] PROCESS FOR THE ELECTROCHEMICAL SEPARATION OF METAL MIXTURES AND METAL ALLOYS

[75] Inventor: Jozef Hanulik, Zurich, Switzerland

[73] Assignee: Recytec S.A., Neuchatel, Switzerland

[21] Appl. No.: 446,109

[22] Filed: Dec. 5, 1989

Related U.S. Application Data

[63] Continuation-in-part of Ser. No. 249,411, Sep. 26, 1988, abandoned.

[30] Foreign Application Priority Data

Sep. 28, 1989 [CH] Switzerland .................... 3748/87

[51] Int. Cl.$^5$ .................... C25C 1/00; C25C 7/00; C22B 3/00
[52] U.S. Cl. .................... 204/105 R; 204/140; 204/240; 204/269; 204/400; 204/434; 204/123; 204/232; 75/724
[58] Field of Search ............ 204/140, 149, 150, 269, 204/232, 114–119, 276, 123, 434, 240, 105 R; 266/170; 75/109, 724

[56] References Cited

U.S. PATENT DOCUMENTS

| | | | |
|---|---|---|---|
| 1,148,798 | 8/1915 | Pyne et al. | 304/269 X |
| 1,255,437 | 2/1918 | Laist et al. | 204/434 X |
| 4,294,434 | 10/1981 | Durkee | 266/170 |
| 4,789,445 | 12/1988 | Goffman et al. | 204/434 X |

Primary Examiner—Donald R. Valentine
Attorney, Agent, or Firm—Kane, Dalsimer, Sullivan, Kurucz, Levy, Eisele and Richard

[57] ABSTRACT

The process for the electrochemical separation of metal mixtures and metal alloys comprises the steps of dissolving the starting material in an elecrolyte, substituting the metals dissolved in the electrolytic solution in succession in accordance with their electrochemical potential by electrochemically less noble metals in each case and depositing them. The electrolytic solution containing the dissolved metals is passed continuously through several cells, connected to each other, in which the electrolytic solution is brought into contact with said less noble metals. Several of the metals dissolved can be substituted simultaneously by one or more electrochemically less noble metals. Metals that are deposited simultaneously together are separated electrolytically from each other, and metals which have again gone into solution are again substituted outside the electrolysis cells by said less noble metals and deposited.

26 Claims, 4 Drawing Sheets

PROCESS FOR THE ELECTROCHEMICAL SEPARATION OF METAL MIXTURES AND METAL ALLOYS

This is a continuation-in-part of copending application Ser. No. 07/249,411 filed on Sept. 26, 1988, now abandoned.

FIELD OF THE INVENTION

The invention relates to a process for the electrochemical separation of metal mixtures and metal alloys, and also to an apparatus for carrying out said process in practice.

The invention is applicable, in particular, to the recovery of heavy metals from waste scrap, the metal constituents in which, in particular, can increasingly pollute and poison the environment.

PRIOR ART

Processes are known with which a few relatively valuable metal components are electrolytically deposited and recovered from waste scrap, for instance, from used electric batteries, but all the other constituents are discarded and deposited on disposal sites.

SUMMARY OF THE INVENTION

The object of the invention is to provide a possibility with which at least the heavy metals contained in waste scrap can be separated and recovered for reutilization in an economic manner, i.e. with the lowest expenditure in terms of equipment and energy and as completely as possible so that they no longer have to be deposited in disposal sites and endanger the environment at such sites.

This is achieved with a process according to patent claim 1, in which an apparatus according to the apparatus claims can be used in an advantageous manner.

Expedient possible embodiments emerge from the subclaims.

In the practical embodiment of the invention, the different electrochemical properties of the heavy metals concerned, in particular their different electrochemical normal potentials according to the so-called voltage series, are exploited in each case in a technically surprisingly simple manner and without special consumption of energy. As is known, this phenomenon states that any metal is substituted in its metal salt solution by a so-called "less nobel" metal having a lower electrochemical potential and is deposited as a metal with the acceptance of electrons, the less noble metal going into solution as a cation with the donation of electrons, a process which proceeds without external supply of energy.

DESCRIPTION OF THE DRAWINGS

The accompanying drawing shows diagrammatically possible embodiments for carrying out the invention in practice, in which.

DESCRIPTION OF THE PREFERRED EMBODIMENTS

Figure 1:
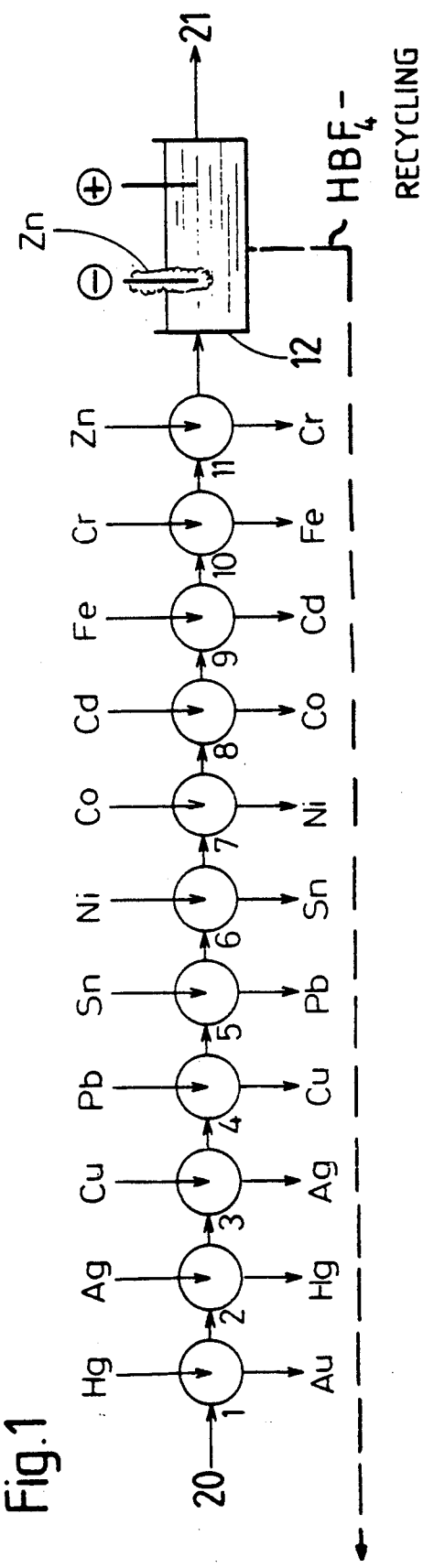
FIG. 1 shows a battery of deposition cells connected in series.

According to the above, the apparatus in FIG. 1 comprises a battery of deposition cells 1 to 11 which are connected in series and an electrolytic cell 12 disposed at the outlet. Here the cells 1 to 12 are each equipped with an inlet 20 and an outlet 21 and the cells 1 to 11 with a discharge device 22 for deposited metal.

Figure 2:
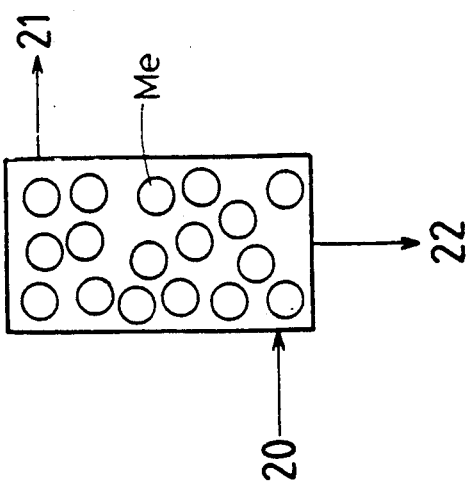
FIG. 2 shows a deposition cell in one embodiment.

In the embodiment of the cells shown in FIG. 2, the latter contain a metal Me which is stationary and has a particular electrochemical potential which decreases from cell 1 to cell 11 in accordance with the so-called voltage series as is indicated in the upper row in FIG. 1 with the appropriate symbols.

Apart from mercury, these metals may, for example, be formed in the shape of spheres as shown. These spheres, with a diameter of, for example, 3 to 5 cm, are loosely arranged in layers with interstices in between, beside and on top of each other and make possible a flow of the electrolyte which flows round these spheres.

The manufacturing material of the cells and connecting pipes must obviously be resistant and insensitive towards the electrolyte solvent. For this purpose, in particular, certain plastics, such as polyethylene and polypropylene, have proved particularly advantageous. However, natural materials with a continuous rubber coating may also be suitable for this purpose.

The electrolyte is obtained by anodic dissolution of the starting mixtures or starting alloys to be separated, for example, of the metals from used electric batteries, electronic printed circuit boards and other electronic scrap, and also used ice boxes and automobiles, in tetrafluoboric acid ($HBF_4$) in which almost all metals are soluble.

This electrolytic solution is fed through the cell inlet 20 into the first cell 1 and then flows in succession through the cells 1 to 11 where it comes into reactive contact with the metal contained in each case therein. During this process, for example, in the cell 1, which contains mercury, gold dissolved in the electrolyte is deposited as a metal while an equivalent quantity of mercury goes into solution as a cation. In the cell 2, which contains silver, the mercury, which is more noble with respect thereto, is deposited from the electrolytic solution and an equivalent quantity of "less noble" silver goes into solution as a cation. This is then deposited in the cell 3 by means of copper which, in turn, is deposited in the cell 4 by lead, and so on, until the electrolytic solution emerging from the last cell 11 contains heavy metals of only an equivalent quantity of zinc cations which can then be deposited electrolytically as metallic zinc in the electrolysis cell 12. It is, however, also possible to work up the dissolved zinc chemically, for example, by precipitation as hydroxide and reduction to metallic zinc. In this case not even electrical energy has to be expended to separate the starting mixtures.

Still less noble metals having a still lower electrochemical potential cannot be deposited directly from the electrolytic solution and remain dissolved as fluoborates. This solution then emerges from the apparatus at outlet 21 of the last cell. They are essentially alkaline earth metals and alkali metals, such as aluminum, magnesium, sodium, potassium, lithium, which, however, usually occur in the starting materials in only very small quantities and are worked up again by known technologies.

If, as in the cell embodiment in FIG. 2, the depositing metal Me is used in the form of spheres loosely arranged in layers on top of each other, it may be expedient to provide a vibrating device or the like which is set in operation from time to time in order to free the spheres from metal deposited at their outer periphery and to create free surfaces. The spheres themselves gradually shrink with progressive solution of their metal which can result in complete solution. The deposited metal which sinks downwards in the cell is then usually drawn off in the form of a crystalline sludge at the discharge device 22.

The rate of reaction is naturally dependent on the ion exchange surface available for the reaction and on the reaction time and can be accelerated by heating.

Figure 3:
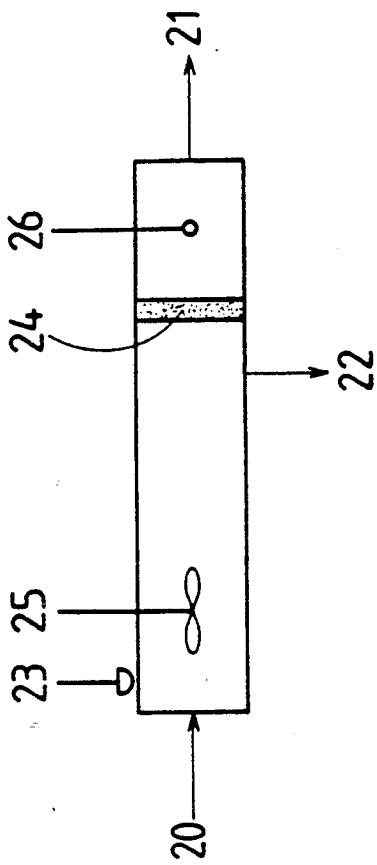
FIG. 3 shows a deposition cell in another embodiment.

The modified embodiment of the deposition cell in FIG. 3 is suitable in particular for use in binary systems, but it can likewise also be used for a continuous operation. It consists of a tubular housing with an inlet 20 and an outlet 21 for the electrolytic solution and is equipped with a device 23 for metered injection of the depositing metal behind the cell inlet in the flow direction. It furthermore also has a discharge device 22 for deposited metal and may, in addition, be provided with a filter 24 upstream of the cell outlet 21 and with a stirrer 25 at the injection device 23.

If, for example, lead is to be deposited by means of zinc in this cell, fine zinc powder is expediently injected in excess through the injection device 2 while stirring with the stirrer 25 into the electrolyte which contains lead in solution and flows through the cell, in a manner such that a suitable reaction temperature is reached and maintained, but spontaneous reaction and overheating is avoided. Consequently, by suitably metering the zinc powder addition, the possibility is in a way provided for making the reaction proceed as fast as is desired. The lead drawn off at the discharge device 22 is crystalline sludge is virtually pure and contains less than 1% zinc, which is composed of unreacted zinc powder and can be leached out with tetrafluoboric acid, possibly while heating. The electrolyte emerging again from the cell outlet 21 no longer contains any lead, but, on the contrary, a quantity of zinc ions, equivalent to the deposited lead, which can then either be deposited electrolytically as metallic zinc or chemically precipitated and further processed.

The filter 24 is intended to prevent zinc powder, injected in excess, and deposited lead being entrained with the electrolyte.

In the direction of flow behind the filter 24 and before the cell outlet 21, an analytical device 26 may furthermore be provided which can operate continuously and can continuously monitor the stream of electrolyte passing through for metal ions which it contains, in the example described, for lead and zinc ions, so that the zinc injection can also be metered in accordance therewith, and can, for instance, be increased if lead ions appear.

Under certain conditions, particularly also as a function of the nature of the starting material to be processed, it may be expedient not to deposit the metals to be separated individually in succession as was described in connection with FIG. 1, but in each case to deposit a group of metals, a multiplicity of metals having an electrochemical potential corresponding to each other being substituted by one or more electrochemically less noble metals compared with all these metals and deposited, and this group of metals deposited together then being separated electrolytically or by another known metallurgical process. The metals which then go back into solution because of their lower electrochemical potential may then be deposited again on a metal which is in each case electrochemically less noble. Thus, it is possible, for example, to deposit simultaneously electrochemically noble metals, such as gold, mercury, silver and copper, by means of lead in a first group and less noble metals, such as lead, tin, nickel, cobalt, cadmium, iron and chromium in a second group by means of zinc which can then be deposited with other metals still present as a third group directly on a cathode or chemically precipitated. The fourth group then contains only base metals which cannot be deposited directly from the solution, such as aluminum, magnesium, sodium, potassium, lithium.

Obviously, depending on requirements and expediency, this division into groups of the metals to be separated can also be carried out more widely or more narrowly by carrying out, for example, a finer division into groups containing at most three cations.

In order to separate electrolytically a group of metals deposited together in one deposition cell a particularly preferred operating procedure may be used instead of known electrolytical or metallurgical processes. Such a group consisting, for example, of a relatively noble metal, a relatively less noble metal and an intermediate metal (that means that this intermediate metal lies between the two former metals on the electrochemical scale) can be separated in an electrolysis cell where the cathode is made of the relatively less noble metal and the anode comprises the above mentioned mixture of three metals in an appropriate housing connected to the electric+pole. The electrolyte comprises an acid (preferred acid: tetrafluoboric acid). The amount of acid should be not sufficient to dissolve spontaneously the amount of the relatively less noble metal present in the anodic chamber. Further the electrolyte may comprise the corresponding salt (preferred salt: tetrafluoborate) of the less noble metal, among others to adjust electric conductivity. This salt may even be the main component by weight with small amounts of free acid to adjust the pH of the electrolyte. Then the current is allowed to flow and the relatively less noble metal of the anodic chamber is first dissolved and redeposited at the cathode whereas the intermediate and the more noble metal will remain at the anode. When the dissolution of the relatively less noble metal is achieved, the electrolyte and the cathode are exchanged: a piece of the intermediate metal is used as a cathode and the electrolyte now comprises acid (preferred acid: tetrafluoboric acid) in an amount not sufficient to dissolve spontaneously the whole intermediate metal present at the anode and eventually the corresponding salt of the intermediate metal. When the electric current flows the intermediate metal is dissolved at the anode and deposited at the cathode whereas the more noble metal remains at the anode.

Care should be taken to particular properties of specific metals. For example, deposited nickel appears in a so called "passivated" form probably due to thin fluoride layers around the nickel grains, which are difficult to dissolve. If the so protected nickel and a more noble metal powder are present together at the anode, the more noble metal will be dissolved before the nickel. As a consequence, if nickel is the intermediate metal, the electrolysis (dissolution+redeposition) of the more noble metal, with a cathode made of said more noble metal, should be performed before the electrolysis of the nickel, with a cathode made of nickel, is performed at last. It may be noted that in presence of small amounts of chloride ions this particular passivation effect disappears; by means of adding for example sodium chloride to the solution, one can re-establish the normal sequence of electrolysis steps.

In any embodiment it is always possible with the process and an apparatus according to the invention to separate metal mixtures and metal alloys from each other on the basis of the different electrochemical potentials of their metallic constituents without expenditure of energy so that the individual metals can be supplied for a reutilization, as a result of which not only are serious environmental problems solved in a simple manner but a material benefit can also be achieved.

In addition, because a complete separation of metal mixtures and metal alloys and a recovery of all their constituents is made possible on using the process according to the invention, waste products which were hitherto regarding as more or less valueless are, moreover, again proving to be a valuable source of metallic raw materials which had otherwise only to be imported from third countries and were thrown away after processing and use. With the invention it is therefore possible to create and maintain a true cycle of available metals in which only small losses which are unavoidable due to process engineering have to be replaced or supplemented.

This "recycling" of the materials used can also take place in an advantageous manner in the case of the electrolytic solvent if, for example, if tetrafluoboric acid is used, the acid, which is again produced in an equivalent quantity in the electrolysis of the zinc in the electrolytic cell 12, is fed back, if necessary after suitable purification, to the electrolyte preparation.

Figure 5:
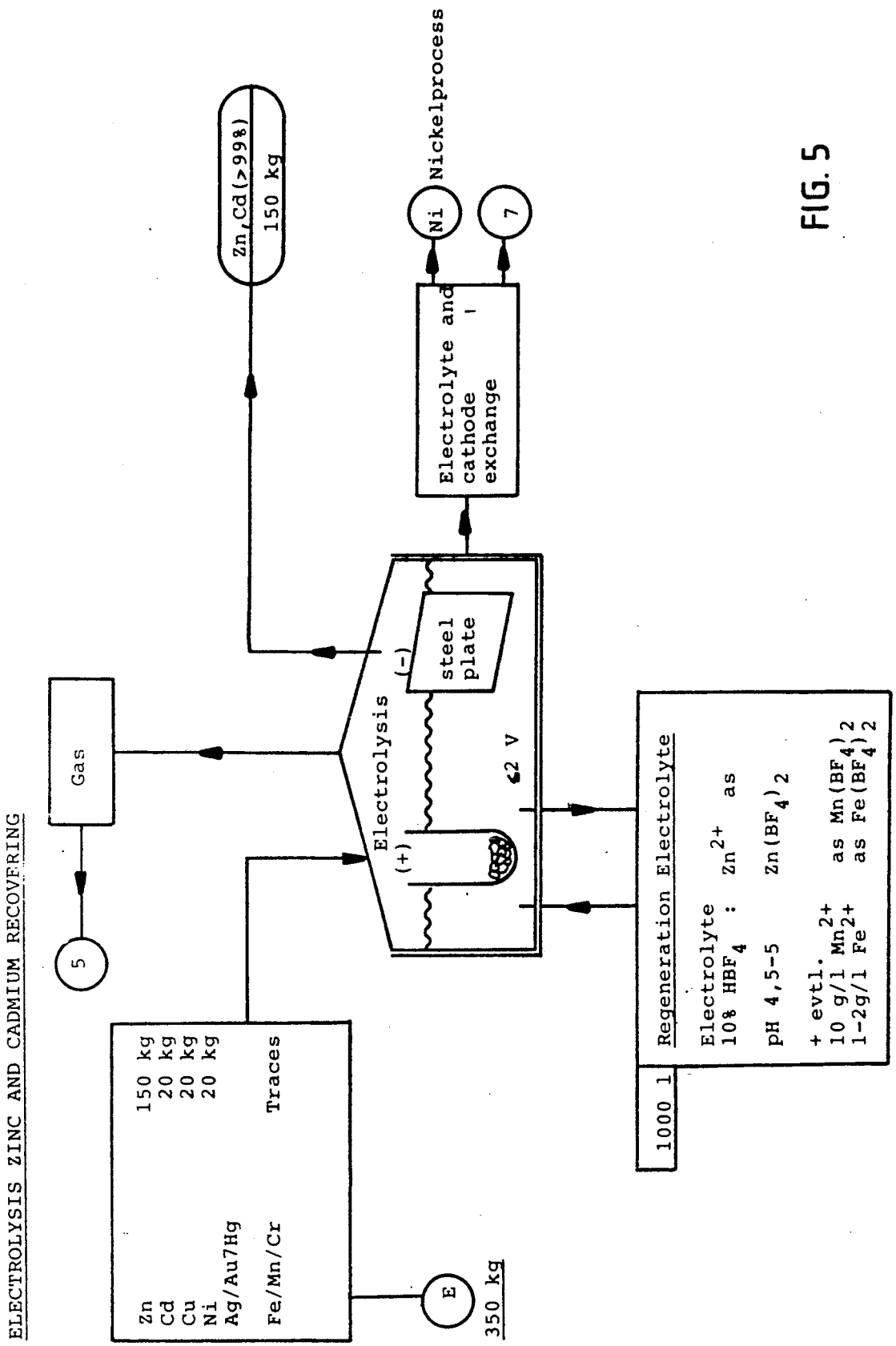
FIG. 5 shows the process for zinc and cadmium recovery.

EXAMPLE 350 kg starring material E comprising used electric batteries electronic printed circuit boards and pieces of alloys are submitted to an anodic dissolution in tetrafluoboric acid. The undissolved ceramic and plastic pieces are discarded as waste and the undissolved manganese dioxyd is floated, filtered, washed, dried and recovered by known procedures. The solution is allowed to flow through a deposition cell of the type shown in FIG. 2, containing copper spheres. The noble metals (Au, Ag, Hg) deposit and are separated by known procedures (for example Hg is distilled off and the mixture Ag+Au is reused in jewelry). The corresponding amount of copper goes into solution. The out coming solution is passed through a cell of the type shown in FIG. 3 and processed with a large excess of zinc powder. This zinc powder may be unpure, for example contaminated with cadmium (see below). At the outlet 21 of this deposition cell a zinc tetrafluoborate solution, free of heavy metals, is recovered from which pure zinc can be recovered by known processes. From the deposited mixture of metallic powder, iron may be eliminated magnetically by known processes. The remaining mixture comprising mainly Zn, Cd, Ni, Cu, is processed to electrolysis step illustrated by FIG. 5. Upon electrolysis first pure zinc is deposited at the cathode and recovered, and latter cadmium appears at the cathode.

It may be noted that:

A rolling steel cathode may be used, from which deposited metal is continuously scrapped and recovered.

The free acid present initially in the electrolyte amounts to less than 25% of the Zn powder dissolution; the rest is dissolved and redeposited upon electrolysis.

Zn/Cd powder mixture depositing during a moment at the cathode may be fed back to the process (cementation step).

This electrolysis step is stopped when all the Zn and Cd present at the anode is dissolved. The electrolyte is regenerated to form again $HBF_4$ in a separate electrolysis step and reused. The electrolyte can also simply be readjusted to pH 4.5–5 by adding a small amount of fresh $HBF_4$, and reused in this state.

Figure 6:
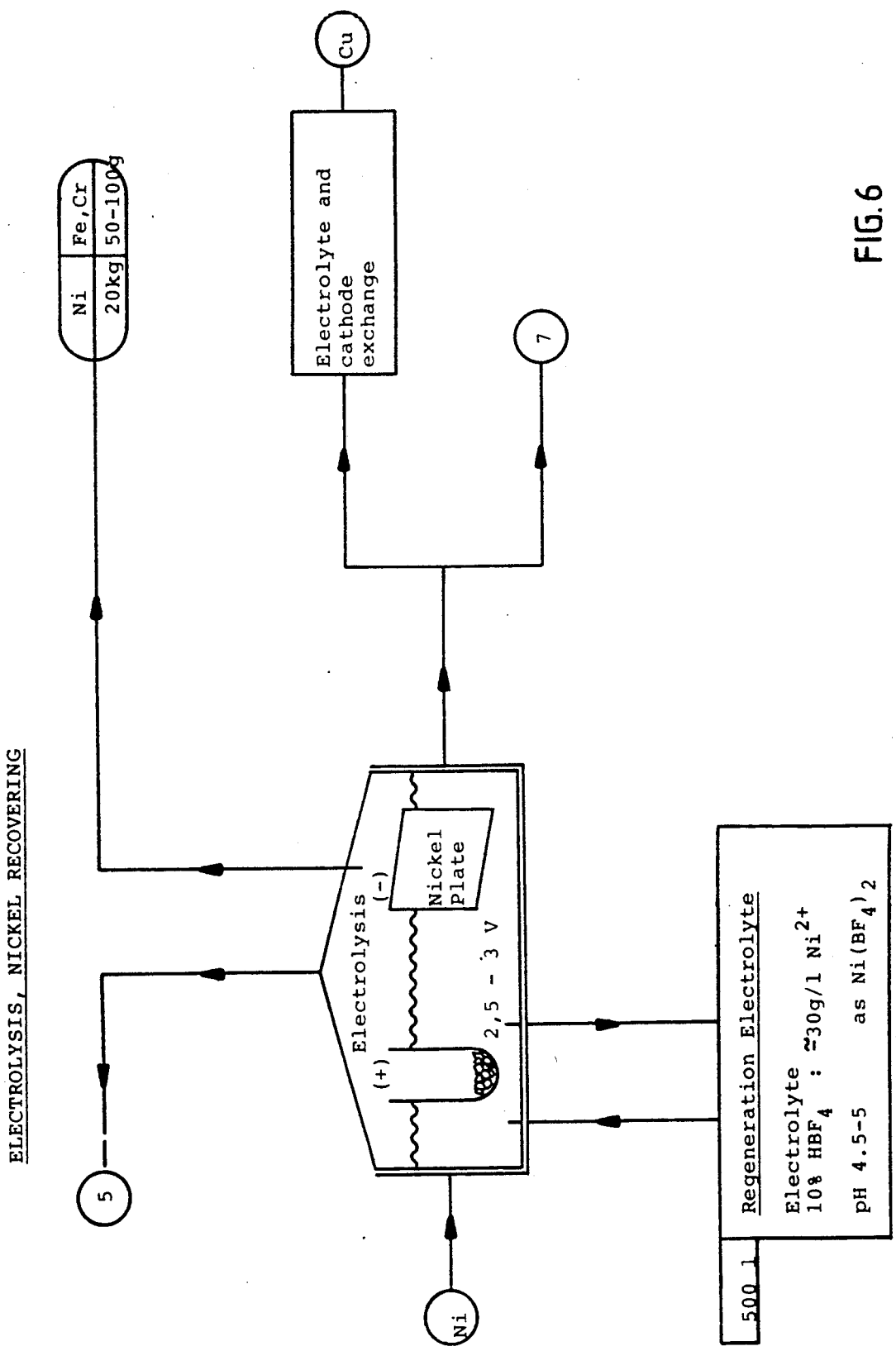
FIG. 6 shows the process for nickel recovery.

After the first step has been performed, the cathode and the electrolyte are changed and the next electrolysis step illustrated by the FIG. 6 is performed. The cathode is a nickel plate and the electrolyte contains mainly nickel tetrafluoborate and small amount of free acid. The total concentration of $BF_4$ (free acid + salt) is about 10% by weight.

The concentration of nickel ions lies between 30 and 50 gr/l the free acid is sufficient to set the pH at approximately 4.5; NaCl is present in the solution at a concentration of about 0.1% by weight.

It may be noted that remaining impurities of Fe and Cr (less than 1%) are deposited with nickel at the cathode. This mixture may be reused as it is in metallurgy.

Figure 4:
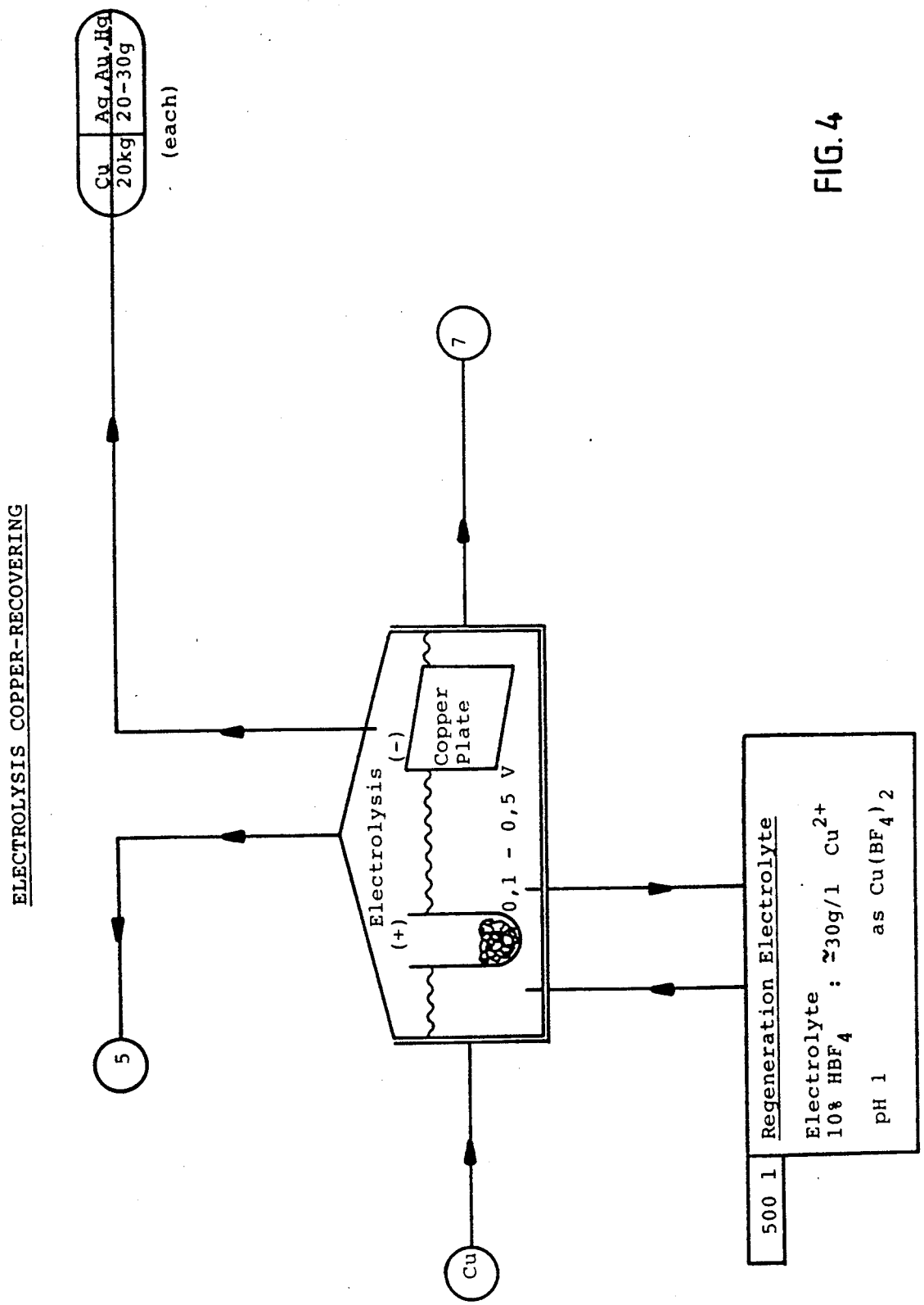
FIG. 4 shows the process for copper recovery.

After the dissolution of all the nickel, copper may be refined by a similar third electrolysis, according to FIG. 4.

The cathode is now a copper plate and the electrolyte comprises copper tetrafluoborate and $HBF_4$.

The concentration of copper ions lies between 20 and 40 gr/l and the free acid is sufficient to set the pH at about 1.

At the beginning of the third electrolysis pure copper deposits at the cathode. At the end of the electrolysis remaining traces of heavier metals (Hg, Ag, Au, . . . ) may also deposit, if the first deposition step was not achieved to completion, and are further processed.

Slimes remain in the anodic chamber, comprising oxydes like $MnO_2$, which are processed by known methods.

I claim:

1. A process for the electrochemical separation off metal mixtures and metal alloys, which comprises dissolving the starting material in an electrolyte, wherein said electrolyte is selected from aqueous solutions of tetrafluoboric acid and salts of said acid, and bringing the electrolytic solution successively in contact with several substitution metals wherein said substitution metals are successively less noble in each case, for substituting the dissolved metals in succession in accordance with their electrochemical potential with electrochemically less noble metals in each case and depositing them.

2. The process as claimed in claim 1, wherein several of the metals dissolved in the electrolytic solution are substituted simultaneously by one or more electrochemically less noble metals and deposited.

3. The process as claimed in claim 2, wherein metals deposited simultaneously together are separated electrolytically from each other in electrolysis cell, metals which have again gone into solution being again substituted outside the electrolysis cell by electrochemically less noble metals in each case and deposited.

4. The process as claimed in claim 3, wherein the substitution metals which are less noble in each case and have gone into solution are deposited electrolytically at a cathode.

5. The process as claimed in claim 3, wherein the substitution metals which are less noble in each case and have gone into solution are worked up chemically.

6. The process as claimed in claim 5, wherein the substitution metals which are less noble in each case and have gone into solution are deposited as insoluble salts and reduced to the metal.

7. The process as claimed in claims 1, 2 or 3, wherein the electrolytic solution is obtained by anodic dissolution of the starting material.

8. The process as claimed in claim 7, wherein a solution of metals in tetrafluoboric acid is used as electrolyte.

9. The process as claimed in claim 3, wherein a distillation of volatile metals is carried out before the electrolysis of the metals deposited simultaneously together.

10. The process as claimed in claim 3, wherein the electrolysis is carried out in a so-called DIETZEL cell with roller-type cathodes.

11. The process as claimed in claim 10, wherein the acid used as electrolytic solvent and again produced in an equivalent quantity during the electrolysis is fed back to the electrolyte preparation.

12. The process as claimed in claim 1 or 2, wherein the electrolytic solution containing the dissolved metals is passed continuously through several cells, connected to each other, in which the electrolytic solution is brought into contact with metals which are electrochemically less noble in each case.

13. A process as set forth in claim 2, wherein said simultaneously substituted metals are deposited simultaneously together and are separated electrolytically from each other, said deposited metals being successively dissolved in an electrolyte and being redeposited electrolytically at at least one cathode.

14. A process as set forth in claim 13, wherein said electrolyte comprises a salt of said metal being dissolved and redeposited and the corresponding acid.

15. The process set forth in claim 14, wherein a cathode made of the same metal as the metal to the deposited is used to deposit said metal.

16. The process as set forth in claims 13, 14, or 15, wherein said metals deposited simultaneously together are separated electrolytically from each other, in succession in accordance with their electrochemical potential.

17. The process as claimed in claim 14, wherein a solution of the said metal in tetrafluoboric acid is used as electrolyte.

18. The process as claimed in claim 17, wherein the electrolysis is carried out in a DIETZEL cell with roller-type cathodes.

19. The process as claimed in claim 17, wherein the acid used as electrolytic solvent and again produced in an equivalent quantity during the electrolysis is fed back to the electrolyte preparation.

20. The process as claimed in claim 13, wherein a distillation of volatile metals is carried out before the electrolysis of the metals deposited simultaneously together.

21. The process as claimed in claim 13, wherein the electrolytic solution containing the dissolved metals is passed continuously through several cells, connected to each other, in which the electrolytic solution is brought into contact with metals which are electrochemically less noble in each case.

22. An apparatus for carrying out the electrochemical separation of metal mixtures and metal alloys, wherein several cells (1 to 11) through which the electrolytic solution can flow continuously are provided with a flow inlet (20) and a flow outlet (21) and also with a discharge device (22) for deposited metal and are connected at their outlet with the inlet of the subsequent cell in the flow direction and contain in each case a metal (Me) which comes into contact with the electrolytic solution and has an electrochemical potential decreasing from cell to cell in the flow direction.

23. The apparatus as claimed in claim 22, wherein the last cell (12) is constructed as an electrolysis cell.

24. The apparatus as claimed in claim 22, wherein the metals (Me) contained in the cells (1 to 11) are arranged in spherical form beside and on top of each other.

25. The apparatus as claimed in claim 24, wherein the cells are equipped with an analytical device (26) which monitors the stream of electrolyte continuously for metal ions in front of their outlet (21).

26. The apparatus as claimed in claim 22, wherein the cells through which the electrolytic solution flows continuously are provided with a device (23) for the metered injection of a metal behind the cell inlet (20) in the flow direction and also, behind that in the flow direction, with a discharge device (22) for deposited metal, and with a filter (24) in front of the cell outlet (21).

* * * * *